United States Patent Office 3,437,509
Patented Apr. 8, 1969

3,437,509
PROCESS FOR COAGULATION OF EMULSIONS WITH STEAM CONTAINING, AS A VAPOR, A MATERIAL WHICH REDUCES EMULSION STABILITY
Hubert Jean Marie Coisne, Armentieres, France, assignor to Lantor Limited, Manchester, England
No Drawing. Filed Apr. 22, 1965, Ser. No. 450,167
Claims priority, application Great Britain, Apr. 30, 1964, 17,911/64
Int. Cl. B44d 1/48; C23c 13/00
U.S. Cl. 117—62                 16 Claims

ABSTRACT OF THE DISCLOSURE

A process for coagulating an emulsion of a high molecular weight organic material within a porous substrate is disclosed, wherein the porous substrate is impregnated with the emulsion and thereafter the impregnated substrate is subjected to the action of steam containing, as a vapor, a material which reduces the stability of the emulsion.

---

The present invention concerns improvements in and relating to the coagulation of emulsions (which expression is used throughout this specification to include dispersions). The invention particularly concerns the coagulation of emulsions after impregnation of porous substrates with such emulsions.

According to the present invention a process for the coagulation of an emulsion of a high molecular weight organic material is provided which comprises subjecting a porous substrate, impregnated with the emulsion, to the action of steam and a material which reduces the stability of the emulsion.

The porous substrate may be, for example, a web of fibres, a woven or nonwoven fabric or paper. The emulsion of high molecular weight organic material may be for example an emulsion of natural rubber; natural or synthetic wax; synthetic rubber such as butadiene/acrylonitrile, butadiene/styrene, polyisoprene, polychloroprene, butadiene/acrylic polymers or copolymers; synthetic resins such as acrylate polymers or copolymers, vinyl chloride, vinyl acetate, vinylidene chloride polymers or copolymers or silicone resins; or mixtures of these various emulsions.

The high molecular weight organic emulsions may also contain additives such as for example stabilising or vulcanising agents, antioxidants, pigments, thermosetting resins or appropriate catalysts.

The steam is preferably at normal atmospheric pressure.

The material which reduces the stability of the emulsion may be for example one which acts as a chemical agent or one which acts as a physical agent or a mixture of both types of agent. Suitable chemical agents are, for example, acids or alkalis or compounds whose pH changes under the influence of steam such as ammonium salts. Suitable physical agents are, for example, volatile alcohols such as methyl or ethyl alcohol or products thickening or reducing in solubility with increase in temperature such as polyvinyl methyl ether. A suitable mixture of both types of agent is an acid-forming catalyst and a thermosetting resin precondensate such as, for example, melamine-formaldehyde or urea-formaldehyde precondensate. The material which reduces the stability of the emulsion may also be one which acts both as a chemical agent and as a physical agent such as, for example, a thermosetting resin precondensate. At elevated temperatures the pH of the precondensate falls with resultant reduction in solubility of the precondensate. In carrying out the invention the material which reduces the stability of the emulsion chosen, must be one which reduces the stability of the particular emulsion used for impregnation of the porous substrate.

The material which reduces the stability of the emulsion may be introduced as a vapour with the steam, or it may be present in the emulsion if it is of such a character that it only acts in the presence of steam or it may be introduced into the porous substrate before treatment with the steam.

By means of the present invention the emulsion may be broken in a short time, for example, 1 minute or even 10 seconds or less. Consequently it is possible to coagulate the emulsion before any substantial drying of the impregnated substrate has taken place and thus substantially to reduce the migration of the emulsion during drying which normally adversely affects the distribution of the organic materials with which the porous substrate has been treated. Such migration hitherto has been a particular difficulty in the treatment of porous substrates with high molecular weight organic materials in the form of emulsions.

By adjusting the time of treatment with steam it is possible to coagulate only a part of the emulsion.

Thus the present invention is of considerable interest in the manufacture of nonwoven fabrics made by bonding together fibres with a bonding agent. Such nonwoven fabrics are made by impregnating a web of fibres with an emulsion of natural or synthetic rubber or resin which is subsequently coagulated to bind the fibres. It has been suggested that the use of heat-sensitised emulsions avoids delamination in the manufacture of such nonwoven fabrics and that coagulation can be effected for example by means of infra-red heat, hot air or by contact with a hot surface. This method, however, only partially reduces migration and the method is generally restricted to the use of emulsions containing at least 20% of solid binder. A further disadvantage of this method is that the emulsifying, stabilising, polymerising and heat sensitising agents in the binder for the nonwoven fabric are more difficult to remove, and the presence of such agents may reduce the resistance of the nonwoven fabric to ageing, to heat and to solvents and they make it more difficult to apply other finishes to the fabric. According to the present invention such agents can be removed from the fabric by washing after coagulation and before final drying.

In one embodiment of the invention a web or fleece made for example on a Curlator machine or a card is impregnated with any suitable emulsion of a bonding agent consisting of a high molecular weight organic material.

For example the impregnating bath may contain synthetic rubber as the bonding agent and may also contain 0.5% of polyvinyl methyl ether and 1% of an ammonium salt such as ammonium chloride. The impregnated web is then passed to a coagulator where the coagulator liquid is boiling water containing 5% of formic acid or acetic acid and 5% of methyl or ethyl alcohol. The acid and the alcohol are entrained in the steam in contact with the web. After coagulation of the bonding agent the web or fleece can be handled without special precautions and surplus liquid can be removed by mangling or by suction. The resulting web can be rinsed in water, with or without a neutralising agent, and dried by heating, or it may if desired be reimpregnated with further quantities of bonding agent before drying. Since according to the present invention 80% of water can be removed from the web by squeezing after coagulation instead of by drying by heating, there is a reduction in heating costs.

The present invention is also of value in the impregnation of yarns with rubber, for example, in the yarns or fabrics used in the manufacture of tyre chafers. Since by the use of steam the emulsion of natural or synthetic rubber is coagulated inside the yarn and migration during drying is substantially reduced it is possible to make rubber-fabric complexes which are more impermeable to air than those which have been made hitherto.

The invention is also of value in finishing textile fabrics. Thus high molecular weight organic materials may be deposited within the yarns of fabrics so that there is less tendency for them to be removed on washing and less change in the normal textile handle. Again in dyeing fabric pigments are bound to the fabric by acrylic emulsions and by the method of the present invention the migration which normally occurs during drying can be substantially reduced.

The invention is illustrated by, but is not limited to, the following examples:

EXAMPLE 1

A web or fleece of flax of 110 g./m.$^2$ was made which was impregnated in a saturator with a composition of the formula:

| | Percent |
|---|---|
| Butakon ML 501 (dry) | 10 |
| Ammonium chloride | 1 |
| Lutonal M 40 | 0.5 |
| Water | 88.5 |

Butakon ML 501 is a butadiene-methacrylate copolymer and Lutonal M 40 is a brand of polyvinyl methyl ether sold by Badische Anilin und Soda Fabrik.

The absorption in the saturator was 3.4 times the weight of the cloth, that is to say the web absorbed 375 g. of the composition per square metre. Since the total solid in the bath was 10%, the final article was 150 g./m.$^2$, with 26% of binder and 74% of fibre. The web was impregnated at the rate of 8 metres per minute.

The impregnated web was passed into a coagulator containing boiling water with 5% of formic acid and 5% of ethyl alcohol. The length of the coagulator was 1.8 metres and the speed of the web through the coagulator was 8 metres per minute, so that it remained in the coagulator for 13 seconds. The level of boiling liquid in the coagulator was about 5 cm. The web passed at about 5 cm. above the level of the liquid without ever touching it since it would thereby be deformed. The web was supported in the coagulator by carrier rollers spaced about 30 cm. apart. The coagulator had a cover in order to keep the vapour medium concentrated in the vicinity of the web.

On leaving the coagulator the web was expressed to remove liquid. From 375 g./m.$^2$ of composition absorbed and which theoretically now contains 335 g. of water, 3.35 g. of ammonium chloride and 40 gm. of coagulated rubber, there was extracted on expressing about 265 g. of water and 2.65 g. of ammonium chloride. Thus there remained in the web about 70 g. of water containing 0.7 g. of ammonium chloride in particular, plus all the associated products which were incorporated with the Butakon ML 501 in the emulsion. Therefore in the first expression, 80% of the harmful products had been removed.

On leaving the expressing process, the web, which already was very firm, passed into a rinsing bath containing 0.5% of sodium carbonate, and then was again expressed. The following reaction occurred in the rinsing bath:

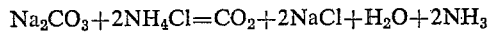
$Na_2CO_3 + 2NH_4Cl = CO_2 + 2NaCl + H_2O + 2NH_3$

Apart from sodium chloride, all the reaction products were volatile.

There now remained in the web about 0.15 g. of sodium chloride per square metre, or less than 5% of the weight of the original ammonium chloride.

In the expressing process, the emulsion stabilisers and other supplementary substances present in the latex, which may have been incorporated either by the emulsion manufacturers or by the user for personal convenience, were also removed.

It may be noted that the rinsing is of value for certain finished articles, but is not indispensable if particularly good stability to ageing and to heat are not required.

It is also to be noted that the first liquor expressed can be recovered and used again for the manufacture of other mixtures. Thus savings can be made for example, in stabilisers, antifoaming agents, ammonium salts and emulsifying agents.

This example could obviously be modified. Thus the fibre could be different as could the type of binder. It is also quite evident that the formic acid could be replaced by any product which will give an acidic vapour medium, and that the methyl alcohol could be replaced by any product which will act physically to effect coagulation. If the emulsion happended to be stable in an acid medium and unstable in an alkaline medium then the acid could be replaced by a product which would give an alkaline vapour medium such as, for example, ammonia.

The products incorporated in the emulsion to render it heat-sensitive may of course be different and may vary according to the nature of the binder and the advice of the manufacturers of the binder.

EXAMPLE 2

A 136 gm./sq. m. web of 1½ denier, 38 mm. viscose rayon fibres was bonded through:

| | Parts |
|---|---|
| Hycar 1571 (B. F. Goodrich registered trademark for a carboxylated butadiene/acrylonitrile latex) | 100.0 |
| Melamine-formaldehyde precondensate | 8.0 |
| Catalyst CR (Hoechst-Cassella, an amine hydrochloride catalyst) | 1.5 | and dried through a hot air drier at 150° C. to a dry add-on of 27 gm./sq. m.

This bonded fabric was then impregnated with:

| | Parts |
|---|---|
| Blue pigment dispersion | 1.5 |
| Hycar 1571 | 5.0 |
| Melamine-formaldehyde precondensate | 0.4 |
| Catalyst CR | 0.075 |
| Water | 100.0 | and the sample was divided into two parts.

One part (sample A) was dried at 300° F. in a forced air circulation oven whilst the other part (sample B) was first passed through the steam coagulation chamber with 1 minute dwell-time in the steam coagulator and then this was dried at 150° C. in the same forced air circulation oven.

After drying, the two samples were compared. Sample A showed excessive migration of pigment to one side of the fabric. Sample B showed only marginal migration.

EXAMPLE 3

A sample of fabric woven from viscose rayon fibres and weighing approximately 170 gm./sq. m. was impregnated through the following mix to a dry pick-up of 34 gm./sq. m.:

| | Parts, dry weight |
|---|---|
| Butakon ML 501 | 10 |
| Ammonium chloride | 1 |
| Lutonal M40 | 0.5 |
| Water | 88.5 |

The sample was divided into 4 parts and these were dried as follows:

Sample 1—oven dried only at 120° C.
Sample 2—steam-coagulated and then oven dried at 120° C.
Sample 3—hot-iron dried only
Sample 4—steam-coagulated and hot-iron dried.

On examination samples 2 and 4 had softer, more supple handle, and less harsh surface feel than samples 1 and 3.

In addition the bending length was determined by the figures described in British Standard 3356 1961 and the following figures were obtained:

| Sample No. | Tested in machine direction (cms.) | Tested across machine direction (cms.) |
|---|---|---|
| 1 | 3.9 | 2.8 |
| 2 | 3.5 | 2.6 |
| 3 | 3.9 | 2.8 |
| 4 | 3.6 | 2.1 |

The lower values indicate that the fabric is softer. The superior properties of Samples 2 and 4 are probably due to the fact that the binder has coagulated inside the yarn.

I claim:

1. Process for the coagulation of an emulsion of a high molecular weight organic material within a porous substrate impregnated with the emulsion which comprises subjecting the substrate to the action of steam containing, as a vapor, a material which reduces the stability of the emulsion.

2. Process according to claim 1 wherein the emulsion is an emulsion of a member selected from the group consisting of natural rubber, natural wax, synthetic wax, synthetic rubber, synthetic resins and mixtures thereof.

3. Process according to claim 1 wherein the steam is at normal atmospheric pressure.

4. Process according to claim 1 wherein the material which reduces the stability of the emulsion is a chemical agent.

5. Process according to claim 4 wherein the chemical agent is a member selected from the group consisting of acids, alkalis and compounds whose pH changes under the influence of steam.

6. Process according to claim 1 wherein the material which reduces the stability of the emulsion is a physical agent.

7. Process according to claim 1 wherein the porous substrate is a web of fibres, the emulsion is an emulsion of a member selected from the group consisting of natural rubber, synthetic rubber and synthetic resins, and wherein after coagulation of the emulsion a nonwoven fabric is obtained which is washed and then dried.

8. Process according to claim 1 wherein the emulsion contains a pigment.

9. Process according to claim 1 wherein the material which reduces the stability of the emulsion is a mixture of a chemical agent and a physical agent.

10. Process according to claim 1 wherein the porous substrate is a web of fibers.

11. Process according to claim 1 wherein the porous substrate is a woven fabric.

12. Process according to claim 1 wherein the porous substrate is a nonwoven fabric.

13. Process according to claim 1 wherein the porous substrate is paper.

14. Process according to claim 6 wherein the physical agent is a member selected from the group consisting of methyl alcohol, ethyl alcohol and polyvinyl methyl ether.

15. Process according to claim 7 wherein the emulsion is an emulsion of synthetic rubber.

16. Process according to claim 15 wherein the emulsion contains 0.5% of polyvinyl methyl ether and 1% of ammonium chloride and the steam and the material which reduces the stability of the emulsion are obtained by boiling water containing 5% of a member selected from the group consisting of formic acid and acetic acid and 5% of a member selected from the group consisting of methyl alcohol and ethyl alcohol.

References Cited

UNITED STATES PATENTS

| | | | |
|---|---|---|---|
| 1,803,936 | 5/1931 | Friedlaender | 117—143 |
| 1,908,719 | 5/1933 | Willson | 117—163 |
| 2,089,925 | 8/1937 | Neiley | 117—163 |
| 2,467,233 | 4/1949 | Rust | 117—141 X |
| 2,526,431 | 10/1950 | Strickhouser | 117—163 |
| 2,874,069 | 2/1959 | Gagarine et al. | 117—141 |

WILLIAM D. MARTIN, *Primary Examiner.*

T. G. DAVIS, *Assistant Examiner.*

U.S. Cl. X.R.

117—63, 140, 145, 155, 158